United States Patent
Bodin

(10) Patent No.: US 7,574,363 B2
(45) Date of Patent: Aug. 11, 2009

(54) INTELLIGENT MERCHANDISE INDICATOR

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 09/935,393

(22) Filed: Aug. 23, 2001

(65) Prior Publication Data
US 2003/0040922 A1  Feb. 27, 2003

(51) Int. Cl.
*G06Q 10/00* (2006.01)
(52) U.S. Cl. ............................................. 705/1; 705/14
(58) Field of Classification Search ...................... 705/1, 705/14
See application file for complete search history.

(56) References Cited

U.S. PATENT DOCUMENTS

| | | | | |
|---|---|---|---|---|
| 5,361,871 A | 11/1994 | Gupta et al. | .................... | 186/61 |
| 5,406,271 A | 4/1995 | Sonnendorfer et al. | . | 340/825.35 |
| 5,459,306 A * | 10/1995 | Stein et al. | .................... | 235/383 |
| 5,539,393 A | 7/1996 | Barfod | .................... | 340/825.52 |
| 5,565,858 A | 10/1996 | Guthrie | .................... | 340/825.35 |
| 5,664,110 A | 9/1997 | Green et al. | .................... | 705/26 |
| 5,818,364 A | 10/1998 | Hintzman et al. | .................... | 341/65 |
| 5,859,414 A | 1/1999 | Grimes et al. | .................... | 235/383 |
| 5,920,261 A | 7/1999 | Hughes et al. | .................... | 340/572 |
| 5,970,474 A | 10/1999 | LeRoy et al. | .................... | 705/27 |
| 2001/0028301 A1 * | 10/2001 | Geiger et al. | .................... | 340/5.91 |
| 2002/0013144 A1 * | 1/2002 | Waters et al. | .................... | 455/414 |
| 2005/0122564 A1 * | 6/2005 | Zehner et al. | .................... | 359/296 |

OTHER PUBLICATIONS www.alerts.com retreived from wayback machine any linkage Feb. 29, 2000.*

* cited by examiner

*Primary Examiner*—John G Weiss
*Assistant Examiner*—Traci L Casler
(74) *Attorney, Agent, or Firm*—Robert H. Frantz; Libby Z. Handelsman; Mark S. Walker

(57) ABSTRACT

An indication to a consumer that a product or item on a retail fixture matches a set of consumer preferences is provided by equipping a retail fixture with a consumer identification unit and with a display unit indicator associated with a sample product on the retail fixture. Responsive to a consumer moving from outside the proximity to inside the proximity of the consumer identification unit, the identity of the consumer is established, and the consumers set of preferences is retrieved. It is then determined, automatically, which sample products on the retail fixture matches the consumers preferences, and a display unit indicator is illuminated for the matching sample products such that the attention of the proximate consumer is directed to the physical location of the matching products.

9 Claims, 7 Drawing Sheets

INTELLIGENT MERCHANDISE INDICATOR

CROSS-REFERENCE TO RELATED APPLICATIONS (CLAIMING BENEFIT UNDER 35 U.S.C. 120)

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to the arts of intelligent merchandise displays, automatic inventory determination and product information exchange.

2. Description of the Related Art

Shopping experiences had by consumers when shopping "online" using the Internet are still distinctly different from shopping experiences in real "bricks-and-mortar" stores. Due to the limitations of transmitting images and photographs of products over the Internet and the extreme convenience of being able to physically touch, pick up, and look at real products in a real store, many shopper still favor shopping in bricks-and-mortar stores.

For example, the shoe display as shown FIG. 1 is typical of displays found in stores, which include a base display (32) and possibly additional display tiers (34) upon which a plurality of items (35, 36) for sale are displayed. This general display paradigm is used for a variety of product types, including clothing, electronics, books, etc.

An alternate display fixture to such a freestanding fixture as shown in FIG. 1 are shelf-based fixtures and wall-based fixtures, such as slatwalls and gridwall fixtures. These fixtures, as well, offer the ability to display multiple items for sale which can be quickly and conveniently scanned by a consumer passerby, and handled if desired by the consumer.

Turning to FIG. 2, two examples are given of display accessories for such retail fixtures, including shoe risers (21) and shoe "faceouts" (22). The risers, typically made of clear acrylic or plastic, allow a shoe to be placed on top of the riser, which is then placed on the surface or tier of the display fixture. This allows more vertical dimensions to be created in the display beyond the number of tiers in the fixture. The faceouts allow a shoe to be mounted on a slatwall or gridwall in a similar fashion. Common faceouts and risers provide means for holding descriptive placards and price tags, and may be imprinted with a brand or logo. For other types of merchandise, such as books or electronics, similar display accessories are available to give vertical position to individual product samples. All of these display fixtures and accessories are well-known in the art.

As a consumer passerby approaches a display fixture, he or she attains a vantage point (31) from which the display designer or arranger intended the products to be viewed, as shown in FIG. 3 in a perspective from above such a display fixture. From this vantage point, the consumer may visually survey all of the displayed items (35, 36), possibly pick up and examine one or more items, and if interested, contact a sales person for more information. The general paradigm of merchandise display can be applied equally well to window displays.

At this point, though, the shopping experience in a bricks-and-mortar store takes on a disadvantage compared to the online shopping experience. Continuing with our example of shoe shopping, a consumer finds a shoe sample on a display fixture which he or she would like to "try on", or about which he or she has questions. Now, the consumer must find an available sales person, which may take considerable time, to ask any questions he or she may have. Or, if the consumer wants to "try on" a pair of shoes or buy a pair of shoes in his or her size, the sales person must check inventory for that model and size, retrieve the item from stock, and proceed with the sale. If the consumer has detailed questions, such as "How long is the warranty on this product?", or "Is this real leather on the upper?", etc., it may take quite some time for the sales person to retrieve the needed information.

By contrast, during an online shopping experience, this phase is much more convenient to the consumer. He or she may simply input his or her size and/or retrieve full technical specifications for the product immediately, without the need to wait for a sales person to assist him or her. Additionally, if the consumer wants to save a copy of the information in order to wait to purchase the item later, he or she may simply print the information from his or her computer and save it for later, while in the bricks-and-mortar store, rarely are extra copies of product information or brochures available nor are copiers readily available.

This often causes many consumers to browse a physical store to survey all the products available, and to later make their purchases online for items they have previously seen. As is well known in the retail sales industry, any time a sale can be completed in a real store, opportunities to make collateral sales as well as to establish an actual personal rapport with the customer are had, but when a customer physically leaves a store, these opportunities are lost.

Therefore, there is a need in the art for a system and method which assists a consumer in determining if an item displayed on an display fixture is in stock according to his or her preferences, such as style, color or size. Further, there is a need in the art for this system and method to conveniently provide product information for later review by the consumer.

BRIEF DESCRIPTION OF THE DRAWINGS

The following detailed description when taken in conjunction with the figures presented herein provide a complete disclosure of the invention.

SUMMARY OF THE INVENTION

An indication is provided to a consumer that a product or item on a retail fixture matches a set of consumer preferences is provided by equipping a retail fixture with a consumer identification unit and with a display unit indicator associated with a sample product on the retail fixture. Responsive to a consumer moving from outside the proximity to inside the proximity of the consumer identification unit, the identity of the consumer is established, and the consumers set of preferences is retrieved. It is then determined, automatically, which sample products on the retail fixture matches the consumers preferences, and a display unit indicator is illuminated for the matching sample products such that the attention of the proximate consumer is directed to the physical location of the matching products.

DETAILED DESCRIPTION OF THE INVENTION

The system and method of the invention provides a means for authenticating and leveraging a persistent store of personal preferences, such as a database, to assist a consumer in his or her shopping in a real "bricks-and-mortar" store. The authentication process coupled with the personal preferences are then used to ascertain whether a certain item is in stock, meets parameters specified by the consumer in his or her preferences, is able to be shipped to the consumer, etc., by referencing a Supply Chain Management (SCM) or other "backend" system in a seamless manner to immediately provide feedback to the consumer of the current status of the item on physical display. As such, by utilizing the invention, a bricks-and-mortar retailer may provide the advantages of real-world shopping, including the ability to touch and handle sample items for sale, and to provide the immediate feedback and information as needed by the consumer regarding specific stock position of an item, product information, etc., typically only available via online shopping.

Figure 1:
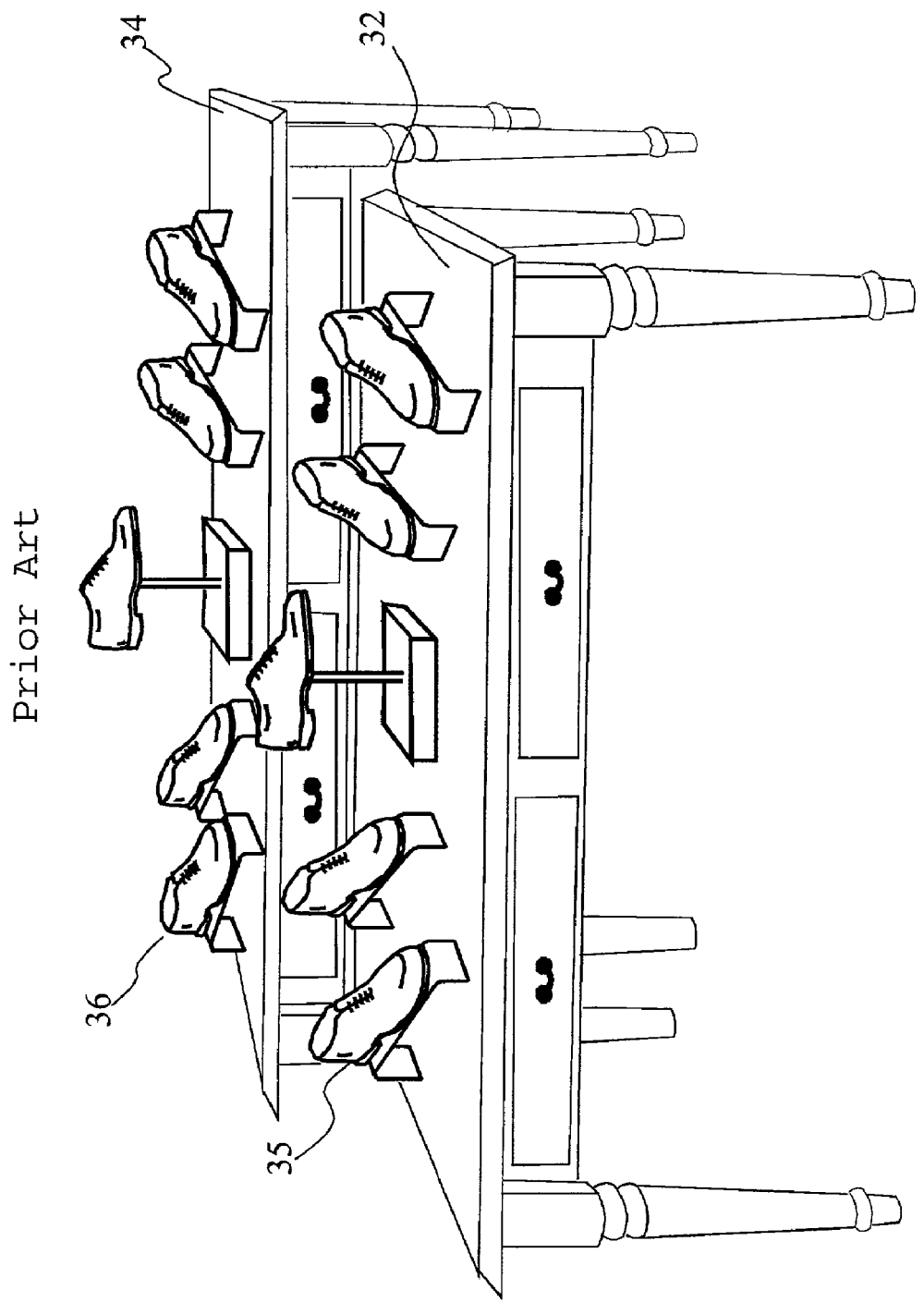
FIG. 1 shows a typical multi-tiered retail product display fixture.
Figure 2:
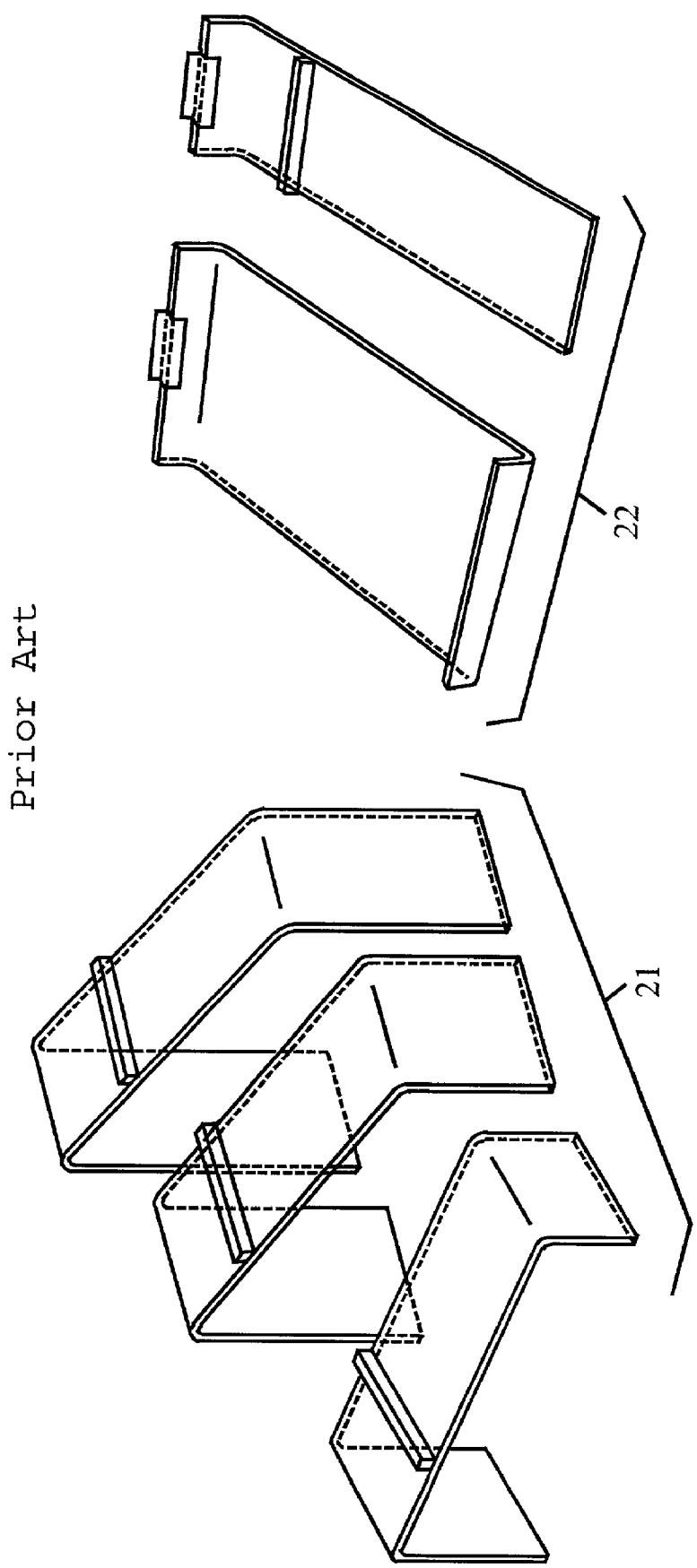
FIG. 2 illustrates several well-known accessories for display fixtures.
Figure 3:
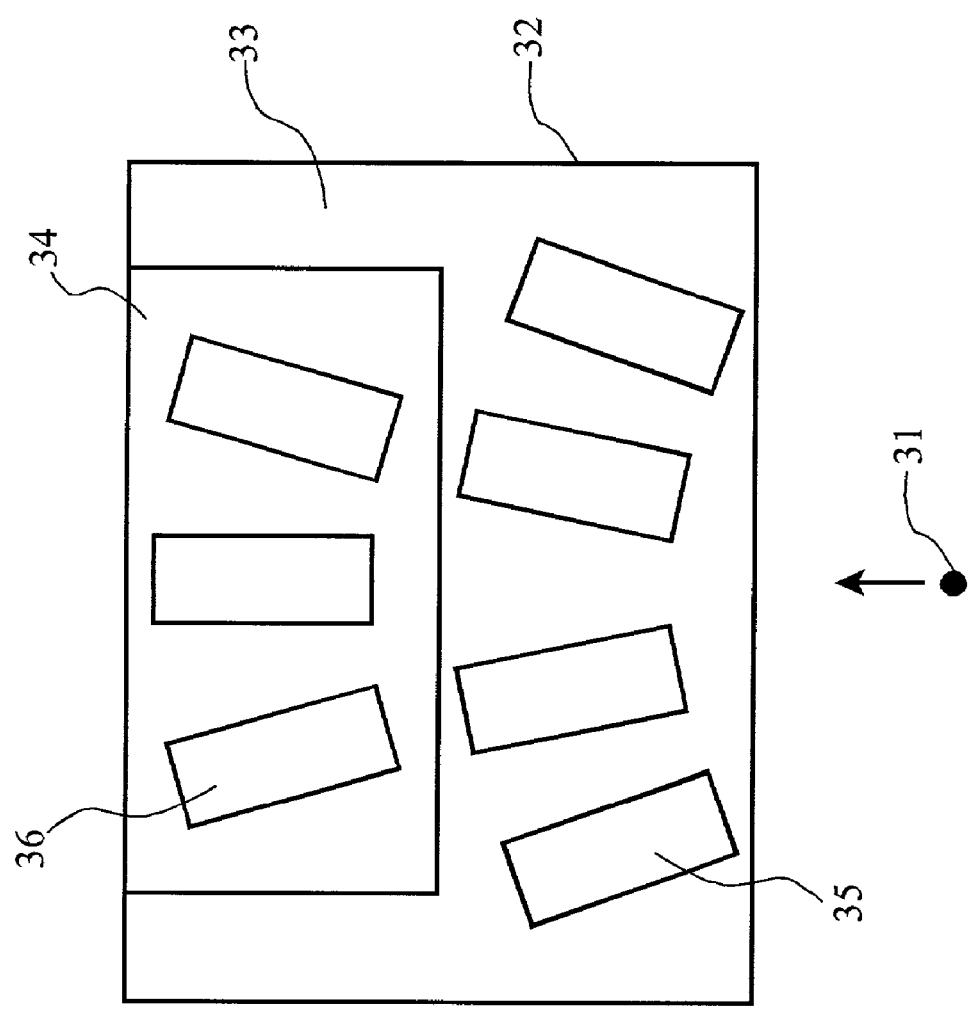
FIG. 3 provides a top-down view of a display arrangement relative to an intended vantage point for a consumer.
Figure 4:
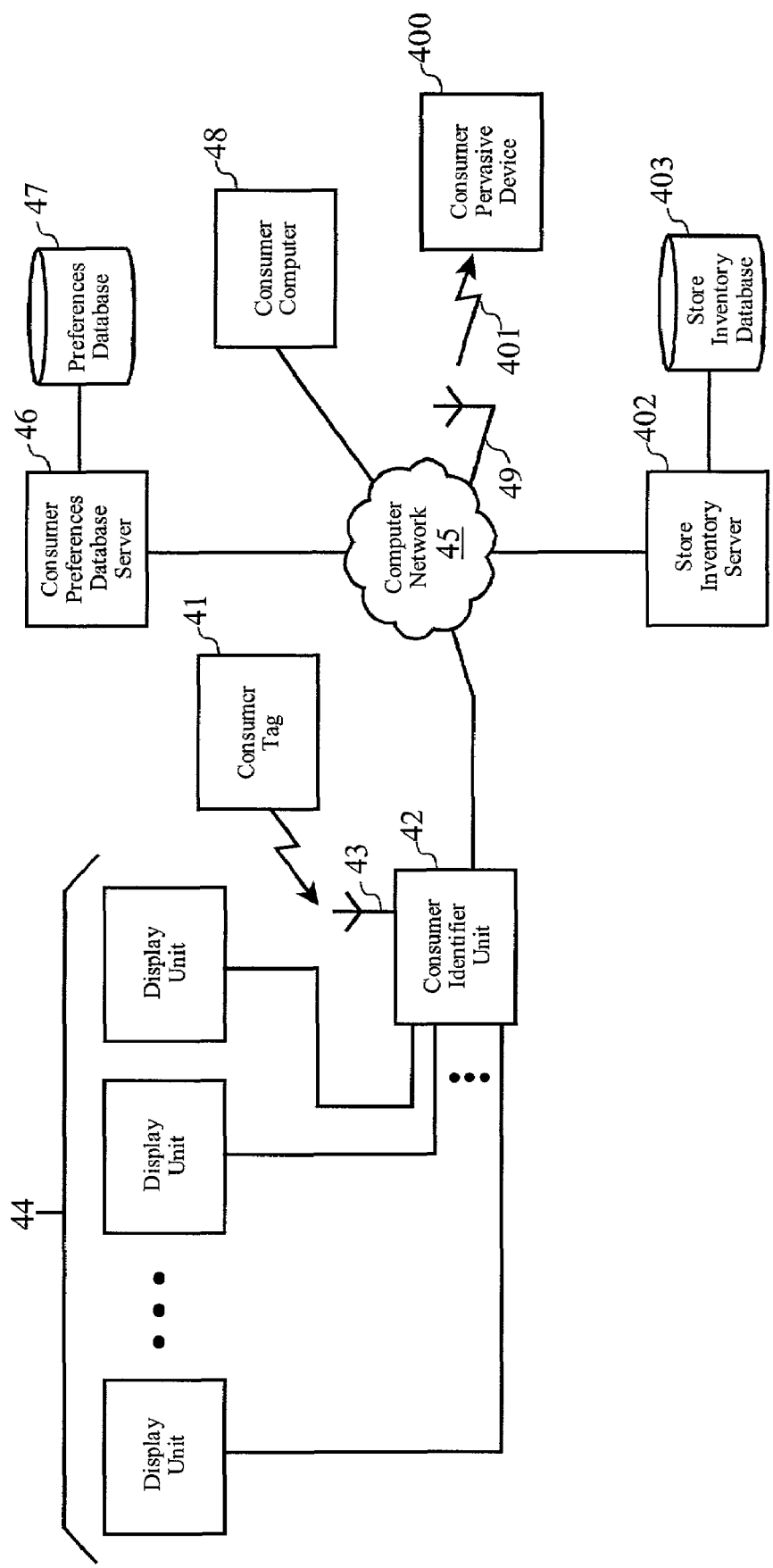
FIG. 4 discloses a system architecture for the invention.

Turning to FIG. 4, the architecture of the invention is shown. At the heart of the system is a consumer tag (41) device of some sort. Many devices are available for this purpose in the art, including the small radio-frequency identification (RFID) tags used for product theft detection. These small devices transmit a code by radio signals when energy is induced into them by a emitter, typically located near the doors of a retail establishment. This code can then be received and decoded by a small receiver, and can be commanded to disable themselves using a return transmission to the tag, such as is done at a point-of-sale terminal when the item has been purchased.

In our system, though, the RFID tag is preferrably used to identify the consumer, not a product. For example, the RFID can be embedded in a "frequent buyer" card or store credit card, and keyed to the name or customer number of the consumer.

Matched to the technology of the consumer tag (41) is a consumer identifier unit (42) equipped with an appropriate transceiving device (43) such as an antenna in the preferred embodiment. The consumer identifier unit (42) in the preferred embodiment is similar to the anti-theft units commonly found at the doorways or exits of retail establishments, except in this case, they are modified or enhanced to drive a number of display unit indicators (44), and to communicate via a computer network (45), which will be discussed in more detail later in this disclosure.

Other readily available technologies, however, may be employed for the consumer tag (41), consumer identifier unit (42) and transceiving device (43), such as a magnetic-striped card and card reader ("card swiper"), and RFkey fob with RF reader similar to the RF-ID device used for gasoline purchases at some gasoline stations, or even the emerging Bluetooth technology which allows devices such as cell phones and watches to communicate with other units. Any means for positively and preferably wirelessly determining the identity of the consumer is acceptable for these functions in the system.

Continuing with the description of the consumer identifier unit (42), it is provided with an interconnection to a computer network (45), such as a local area network (LAN), infra-red network (IR), wireless LAN, or the Internet. Also interconnected to the computer network (45) is a consumer preferences server (46) which has a consumer preferences persistent datastore (47) such as a database.

The consumer identifier unit (42) is adapted to request preferences for a particular consumer from the consumer preferences server (46) via the computer network, and to receive the preferences from the server (46). The consumer identifier unit (42) may then activate one or more display unit indicators (44) to attract the attention of the consumer and to indicate that a product meets or matches the consumer's preferences.

It is important to note that the use of separate consumer identifier units (42) and preference servers (46) interconnected by a computer network is a facet of the preferred embodiment, but does not preclude the integration of these units into one device, thereby obviating the need for the computer network.

Figure 7:
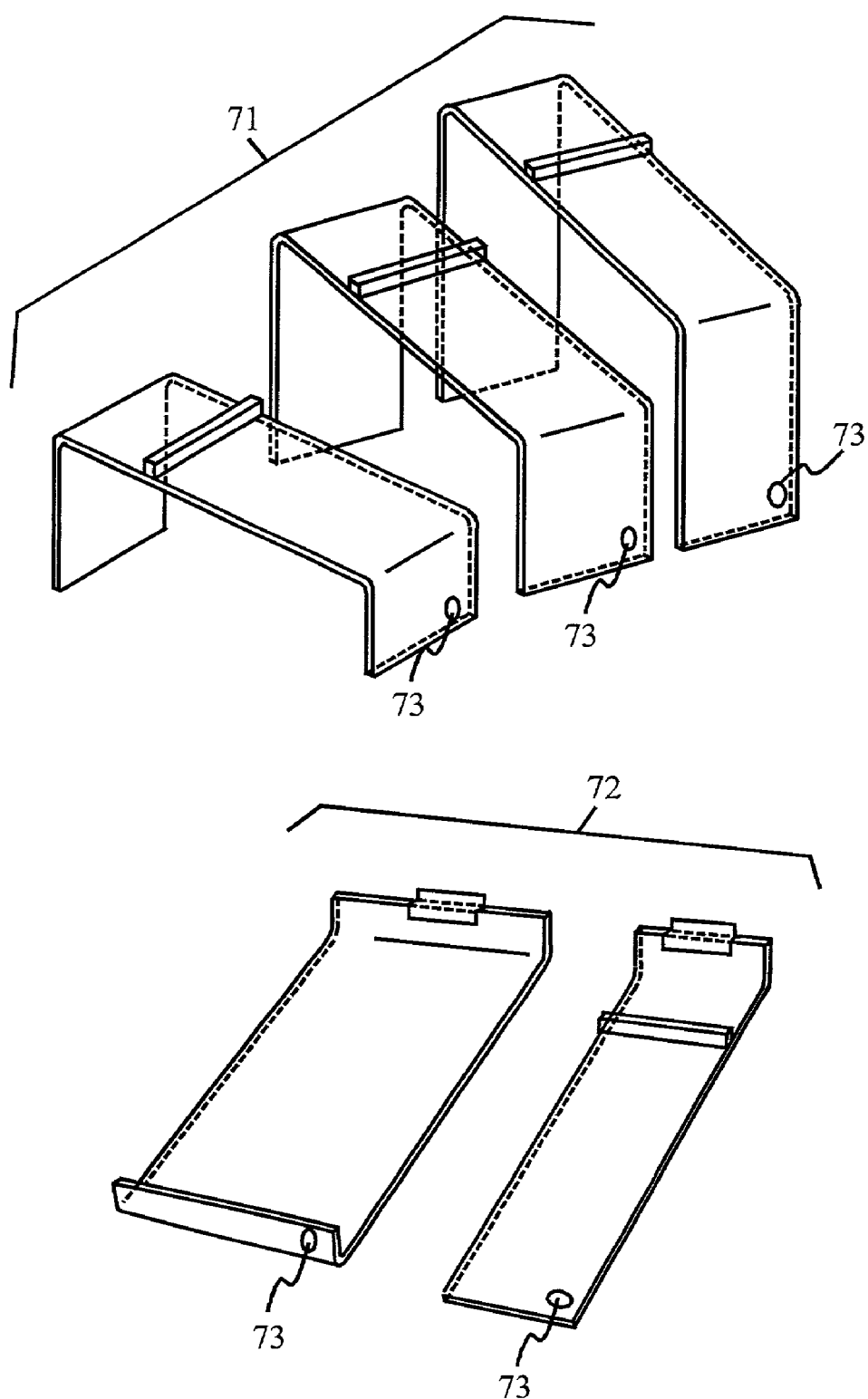
FIG. 7 illustrates the enhanced display accessories which include indicators for drawing a consumer's attention to a particular displayed item.

According to the preferred embodiment, the display unit indicators (44) are high-intensity light emitting diodes (LEDs) mounted (73) on or near display accessories for the display fixture, as shown in FIG. 7. These LED's are driven by wires connected to the consumer identifier unit (42). In one enhanced embodiment, the display unit indictors may be alphanumeric displays, such as liquid crystal displays (LCD), so that detailed information may be displayed. In an even more advanced embodiment, a computer-driven projector such as those commonly used for making presentations may be mounted above the display fixture such that images may be projected onto or around the displayed product samples which match the consumer's preferences.

The consumer identifier unit (42) may be mounted on the front or underneath the surface of the display fixture itself, or alternatively in a nearby fixture or even on the ceiling above the fixture. Wires or leads to the indicators may be concealed under the surface of the display fixture or covered with a cloth or other decorative product.

The consumer preferences server (46) and persistent preferences datastore (47) is preferably an IBM WebSphere Enterprise system, which is well known in the art and can be readily adapted to the function specified herein. Alternatively, any suitable server system and software suite may be employed. The individual consumer records and preference data may be configured by a system administrator, such as by transcribing information from a consumer survey or profile form, or entered via another networked computer such as a web browser using web forms. The preferences data may include the consumer's clothing sizes, color preferences, style preferences (e.g. traditional, trendy, country, etc.), age, race or ethnic background, income level, or any other demographic which may be useful in helping determine which products may be of interest to a consumer and whether or not an item matching his or her preferences is in stock.

The SCM (402) is also preferably available via a computer network, if not integrated to the consumer preferences database. The SCM (402) provides information on a query-basis regarding actual stock of specific products from a store inventor (403).

So, using our shoe shopping example, consider a young female shopper who wears size 7 shoes and prefers trendy styles. Additionally, blue is her favorite color, and she prefers to spend less than $75 on a pair of shoes. This information is configured into the consumer preferences database (47).

During a shopping trip at a store, a multi-tiered display of 15 shoes is encountered by our shopper, which happens to be equipped with the invention, and she is carrying a "frequent buyer" card for the store having a RFID embedded in it.

As she approaches the display, the RFID tag enters into the proximity of the consumer identifier unit, and through an electronic exchange, she is identified. Then, the consumer identifier unit queries the consumer preference server, and receives the shopper's preferences (shoe_size=7, fav_color=blue, fav_style=trendy, max_price=$75.00).

The consumer identifier unit then queries the SCM for stock position of each of the shoes displayed on the fixture which are from trendy collections, size 7, under $75, and preferably blue in color. The SCM returns a message to the consumer identifier unit that 2 models of shoes on the display fixture are in stock, so the consumer identifier unit activates the two indicators (LED's) associated with those to samples.

The consumer, then, sees an immediate LED illumination under or near two shoe samples on the display fixture as she approaches the display, which immediately attracts her attention to the shoes and informs her that they are actually in stock and available, without needing to find an available sales person. She may proceed to physically examine the samples, if desired.

Returning to FIG. 4, details of an enhanced embodiment are shown including a consumer computer (48), and/or a consumer pervasive device (400) such as a web-enabled or wireless applications protocol (WAP) wireless telephone or personal digital assistant (PDA), either of which are communicably interconnected to the consumer preferences server (46) via a computer network (45).

Additional functionality is added to either the store inventor server (402) or preferably to the consumer preferences server (46) which allows the consumer to receive electronic copies of information regarding the products seen on the display fixture, such as product specifications or brochures. This information can be delivered by e-mail if the consumer's e-mail address is configured in the preferences database (47), or it could be a web page created especially for the user on the retailer's web site. For example, continuing with our shoe shopping scenario, information such as catalog pages in the form of Hyper Text Markup Language (HTML) pages could be automatically e-mailed to our hypothetical shopper's consumer computer using Simple Mail Transfer Protocol (SMTP) for her review later. Or, the same information could be transmitted to her PDA with wireless interface so that she could browse the information while standing in front of the display.

This latter function (receipt and browsing of the information while physically present at the display fixture) is especially useful for situations such as electronics displays or food displays where the information may be highly technical or detailed. For example, a shopper looking for the "perfect" MP3 electronic music player may be comparing 20 or 30 parameters, including memory size, unit weight, battery life, computer interface, etc. An electronic copy of the product(s) specifications could be delivered to his wireless networked PDA while he stands in front of a display having 15 MP3 players on it, 4 of which are highlighted by indicators as matching his preferences.

Figure 5:
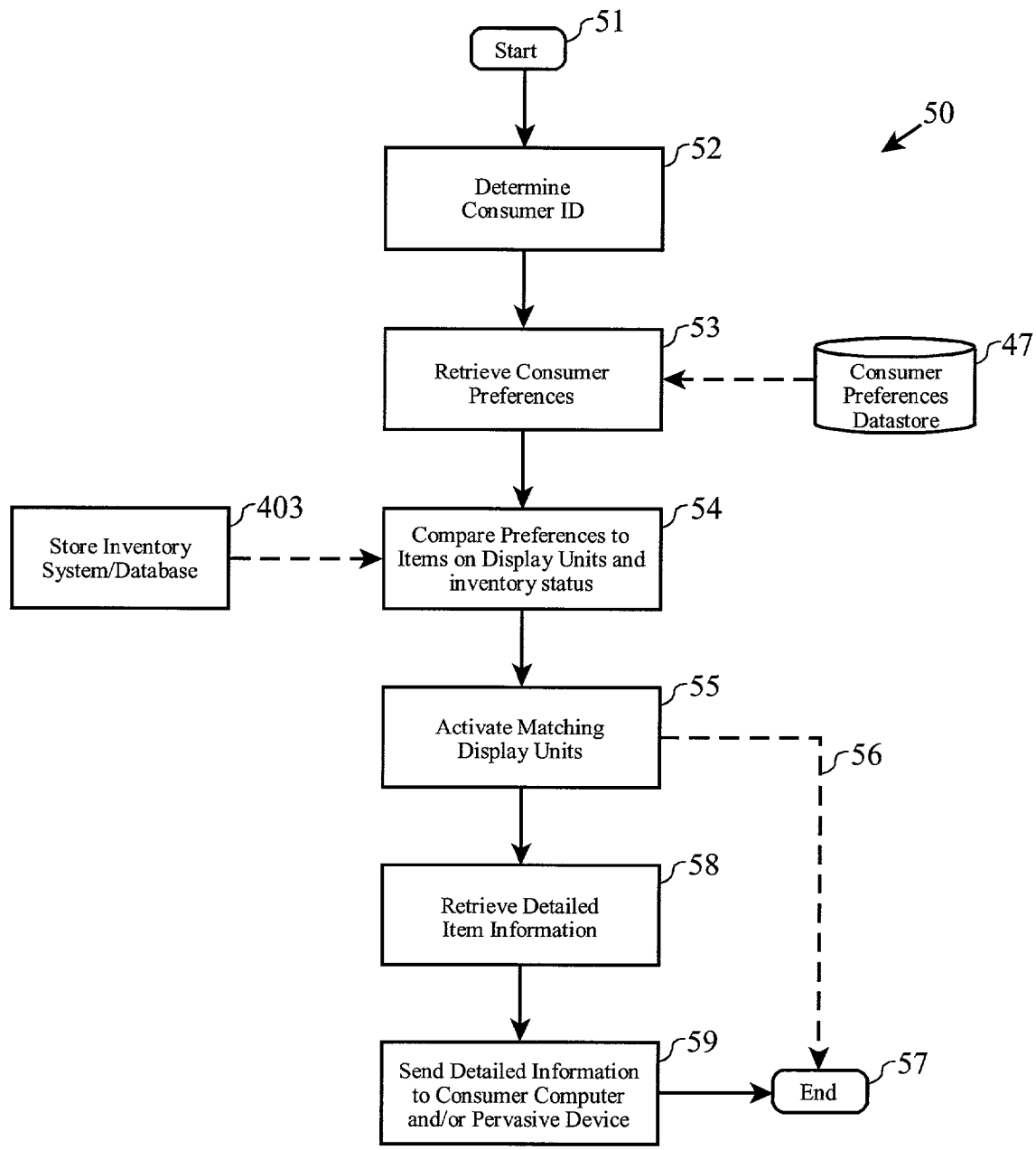
FIG. 5 sets forth the logical process of the method of the invention.

Turning to FIG. 5, the logical flow (50) of the method of the invention is shown. The process is typically started (51) when a consumer moves into the proximity of a proximity-activated consumer identification unit such as an RFID reader, or upon action by the consumer such as swiping a card with a magnetic strip or submitting a bar code for reading on a user ID card. Immediately, the consumer's identification is determined from the consumer tag, and the consumer's preferences are retrieved (53) from the preferences data store (47).

Next, store inventor (403) is checked and compared (54) to the consumer's preferences, such as checking for items which match the consumer's size, favorite color, or other specification such as MP3 players under $200.

If any matches are found, the display indicators associated with the samples on the display fixture are activated to draw the consumer's attention to those items, and to confirm automatically that stock matching the preferences is available. In the most fundamental embodiment of the invention (56), the method may end next (57).

According to the enhanced embodiment of the invention, more detailed information may be retrieved (58) for the matching items, such as product brochures or specifications, and this information is transmitted (59) to the consumer's computer or pervasive device.

Figure 6:
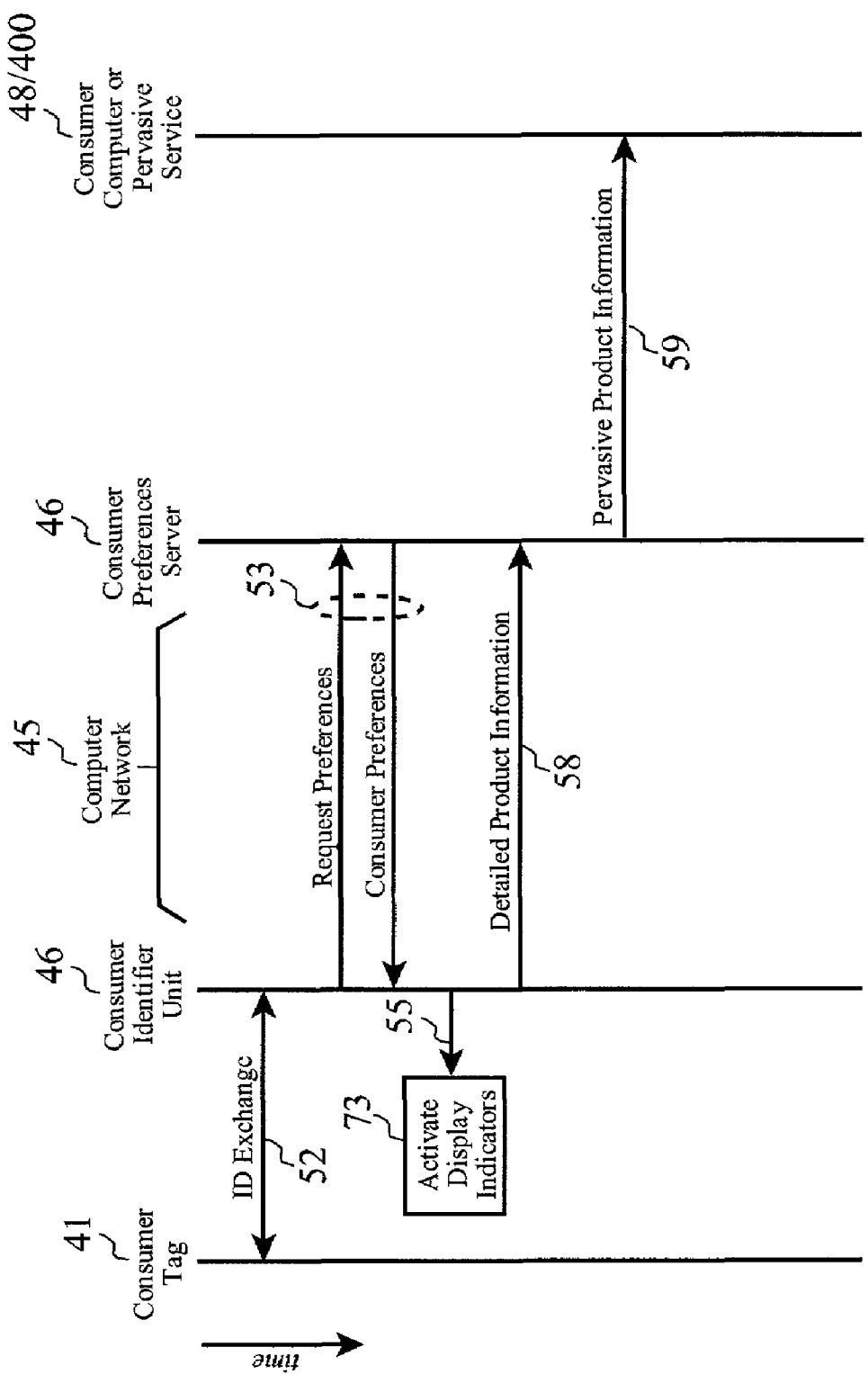
FIG. 6 illustrates the communications or actions in the inventive method between various components of the preferred embodiment.

FIG. 6 illustrates the logical flow of communications related to the steps disclosed in FIG. 5 for better understanding of the preferred embodiment.

Turning now to FIG. 7, enhanced display accessories such as product risers (71) and faceouts (72) are shown in which LED's (73) are provided on a viewable face of the accessories to form the display indicators of the preferred embodiment.

While a preferred embodiment has been disclosed in detail and certain alternate and enhancements have been given, it will be recognized by those skilled in the art that some variations and substitutions may be made without departing from the spirit and scope of the invention. Likewise, it will also be readily recognized by those skilled in the art that the examples given herein are for illustrative purposes only, and do not form limitations as to the usefulness, applicability or objectives of the invention. Therefore, the scope of the present invention should be determined by the following claims.

What is claimed is:

1. A method for indicating that a product or item on a retail fixture matches a set of consumer preferences comprising the steps of:

equipping a retail fixture with a consumer identification unit and with a display unit indicator, said consumer identification unit having an identification proximity, said display unit indicator being associated with a sample product on said retail fixture, said retail fixture comprising a fixture selected from a group of a shelf, a table, a faceout, a riser, a slatwall, and a gridwall, said sample product being an actual, real item for sale or specimen of a set of items for sale;

responsive to a consumer moving from outside said proximity to inside said proximity, electronically establishing an identity of said consumer;

automatically accessing a persistent datastore to retrieve a set of preferences associated with said consumer identity;

automatically determining which sample products on said retail fixture match said preferences; and activating said display unit indicator to illuminate said sample products which match said preferences such that the attention of said proximate consumer is directed to the physical location of the matching products, said illumination comprising projecting an image around said sample products using a computer-driven projector.

2. The method as set forth in claim 1 wherein said step of establishing the identity of a consumer is selected from the group of reading a radio frequency identifier tag, reading a bar code, reading a magnetic stripe, and receiving input of a personal identifier code.

3. The method as set forth in claim 1 wherein said step of accessing a persistent datastore comprises accessing a database.

4. The method as set forth in claim 1 wherein said step of determining which products match said preferences includes a step from the group of matching a consumer size, matching a preferred color, and matching a preferred price.

5. The method as set forth in claim 1 further comprising the steps of:
   retrieving an information data set associated with said products which match said preferences; and
   transmitting said information data set to a preferred electronic destination associated with said consumer such that said consumer may collect said information data set for review and reference.

6. The method as set forth in claim 5 wherein said step of transmitting said information data set comprises transmitting an electronic mail message to an electronic mail address.

7. The method as set forth in claim 5 wherein said step of transmitting said information data set comprises transmitting an electronic file to a electronic mail address.

8. The method as set forth in claim 5 wherein said step of transmitting said information data set comprises transmitting an electronic mail message to a persistent computing device selected from the group of an Internet-enabled wireless telephone, a wireless networked personal digital assistant, and a wireless Internet browser appliance.

9. The method as set forth in claim 1 further comprising the steps of:
   accessing an inventory datastore; and
   determining if a product which matches said preferences is also in stock.

* * * * *